US010089915B2

(12) United States Patent
Kim et al.

(10) Patent No.: US 10,089,915 B2
(45) Date of Patent: Oct. 2, 2018

(54) GATE DRIVING CIRCUIT CONTROLLING A PLURALITY OF TRANSISTORS WITH ONE Q NODE AND DISPLAY DEVICE USING THE SAME

(71) Applicant: LG Display Co., Ltd., Seoul (KR)

(72) Inventors: Haye Kim, Gyeonggi-do (KR); Seeung Lee, Gyeonggi-do (KR); Seonghun Jeong, Gyeonggi-do (KR)

(73) Assignee: LG Display Co., Ltd., Seoul (KR)

( * ) Notice: Subject to any disclaimer, the term of this patent is extended or adjusted under 35 U.S.C. 154(b) by 168 days.

(21) Appl. No.: 15/148,265

(22) Filed: May 6, 2016

(65) Prior Publication Data

US 2016/0379546 A1 Dec. 29, 2016

(30) Foreign Application Priority Data

Jun. 24, 2015 (KR) ........................ 10-2015-0089830

(51) Int. Cl.
*G06F 3/038* (2013.01)
*G09G 3/20* (2006.01)
*G09G 3/3266* (2016.01)
*G09G 3/36* (2006.01)

(52) U.S. Cl.
CPC ......... *G09G 3/2092* (2013.01); *G09G 3/3266* (2013.01); *G09G 3/3659* (2013.01); *G09G 3/3677* (2013.01); *G09G 2310/0262* (2013.01); *G09G 2310/0267* (2013.01); *G09G 2310/0286* (2013.01); *G09G 2310/08* (2013.01); *G09G 2330/028* (2013.01)

(58) Field of Classification Search
CPC ............. G09G 3/2092; G09G 2310/08; G09G 2310/0267; G09G 2330/028
USPC .......................................................... 345/213
See application file for complete search history.

(56) References Cited

U.S. PATENT DOCUMENTS

2008/0191980 A1* 8/2008 Jeon ..................... G09G 3/3677 345/87
2010/0277206 A1* 11/2010 Lee ...................... G09G 3/3677 327/108
2012/0114092 A1* 5/2012 Kim ....................... G11C 19/28 377/69
2013/0300681 A1* 11/2013 Jamshidi-Roudbari ...................... G06F 3/0412 345/173
2014/0111413 A1* 4/2014 Chen ...................... G11C 19/28 345/100
2015/0170592 A1* 6/2015 Bai ...................... G09G 3/3648 345/100

* cited by examiner

*Primary Examiner* — Jonathan Blancha
(74) *Attorney, Agent, or Firm* — Morgan, Lewis & Bockius LLP

(57) ABSTRACT

A gate driving circuit and a display device using the same are provided. The gate driving circuit includes a first gate driving circuit configured to sequentially generate first and second output voltages and a second gate driving circuit configured to sequentially generate first and second output voltages. The first gate driving circuit and the second gate driving circuit are asymmetrically connected to gate lines. The first output voltage of the first gate driving circuit is supplied to an nth gate line, and the second output voltage of the second gate driving circuit is supplied to the nth gate line.

7 Claims, 8 Drawing Sheets

GATE DRIVING CIRCUIT CONTROLLING A PLURALITY OF TRANSISTORS WITH ONE Q NODE AND DISPLAY DEVICE USING THE SAME

This application claims the benefit of Korean Patent Application No. 10-2015-0089830 filed on Jun. 24, 2015, the entire contents of which is incorporated herein by reference for all purposes as if fully set forth herein.

BACKGROUND OF THE INVENTION

Field of the Invention

The present disclosure relates to a gate driving circuit for shifting a gate pulse using a shift register and controlling a plurality of pull-up transistors using one Q node and a display device using the gate driving circuit.

Discussion of the Related Art

Examples of a flat panel display include a liquid crystal display (LCD), a plasma display panel (PDP), an organic light emitting diode (OLED) display, and an electrophoresis display (EPD).

A driving circuit of a display device includes a pixel array, on which an image is displayed, a data driving circuit supplying a data signal to data lines of the pixel array, a gate driving circuit (or a scan driving circuit) sequentially supplying a gate pulse (or a scan pulse) synchronized with the data signal to gate lines (or scan lines) of the pixel array, a timing controller controlling the data driving circuit and the gate driving circuit, and the like.

Each pixel may include a thin film transistor (TFT) supplying a voltage of the data line to a pixel electrode in response to the gate pulse. The gate pulse swings between a gate high voltage VGH and a gate low voltage VGL. The gate high voltage VGH is set to be greater than a threshold voltage of the TFT, and the gate low voltage VGL is set to be less than the threshold voltage of the TFT.

A technology for embedding the gate driving circuit and the pixel array in a display panel has been applied. The gate driving circuit embedded in the display panel is known as "GIP (Gate-In Panel) circuit". The GIP circuit includes a shift register. The shift register includes a plurality of cascade connected stages. The stages generate an output in response to a start pulse and shift the output in accordance with clock timing.

The stages of the shift register include a Q node charging the gate line, a QB node discharging the gate line, and a switch circuit connected to the Q node and the QB node. The switch circuit charges the Q node in response to the start pulse or an output of a previous stage and increases the voltage of the gate line. The switch circuit includes metal oxide semiconductor field effect transistors (MOSFETs).

Each stage of the shift register generates an output when a voltage of the Q node is boosted to a voltage equal to or greater than a threshold voltage of a pull-up transistor. The output of the stage is supplied to one gate line as the gate pulse. Thus, as the number of gate lines increases due to an increase in a resolution of the display panel, the size of the gate driving circuit increases. The GIP circuit is formed in a bezel area of the display panel, on which an image is not displayed. Thus, an increase in the size of the GIP circuit leads to an increase in the bezel area of the display panel.

SUMMARY OF THE INVENTION

Accordingly, the present invention is directed to a gate driving circuit and display device using the same that substantially obviates one or more of the problems due to limitations and disadvantages of the related art.

An object of the present application is to provide a gate driving circuit capable of reducing a circuit size and a display device capable of reducing a bezel of a display panel and implementing uniform image quality of the entire screen using the gate driving circuit.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, a gate driving circuit comprises a first gate driving circuit configured to sequentially generate first and second output voltages and a second gate driving circuit configured to sequentially generate first and second output voltages. The first gate driving circuit and the second gate driving circuit are asymmetrically connected to gate lines. The first output voltage of the first gate driving circuit is supplied to an nth gate line, where n is a positive integer, and the second output voltage of the second gate driving circuit is supplied to the nth gate line.

In another aspect, a display device comprises a display panel including data lines and gate lines, a data driving circuit configured to supply a data signal to the data lines, a first gate driving circuit connected to one end of the respective gate lines and configured to sequentially supply first and second output voltages to the gate lines, and a second gate driving circuit connected to the other end of the respective gate lines and configured to sequentially supply first and second output voltages to the gate lines.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE ILLUSTRATED EMBODIMENTS

A display device according to an exemplary embodiment of the invention may be implemented based on a flat panel display, such as a liquid crystal display (LCD), a field emission display (FED), a plasma display panel (PDP), an organic light emitting diode (OLED) display, and an electrophoresis display (EPD).

Reference will now be made in detail to embodiments of the invention, examples of which are illustrated in the accompanying drawings. Wherever possible, the same reference numbers will be used throughout the drawings to refer to the same or like parts. It will be paid attention that detailed description of known arts will be omitted if it is determined that the arts can mislead the embodiments of the invention.

Figure 1:
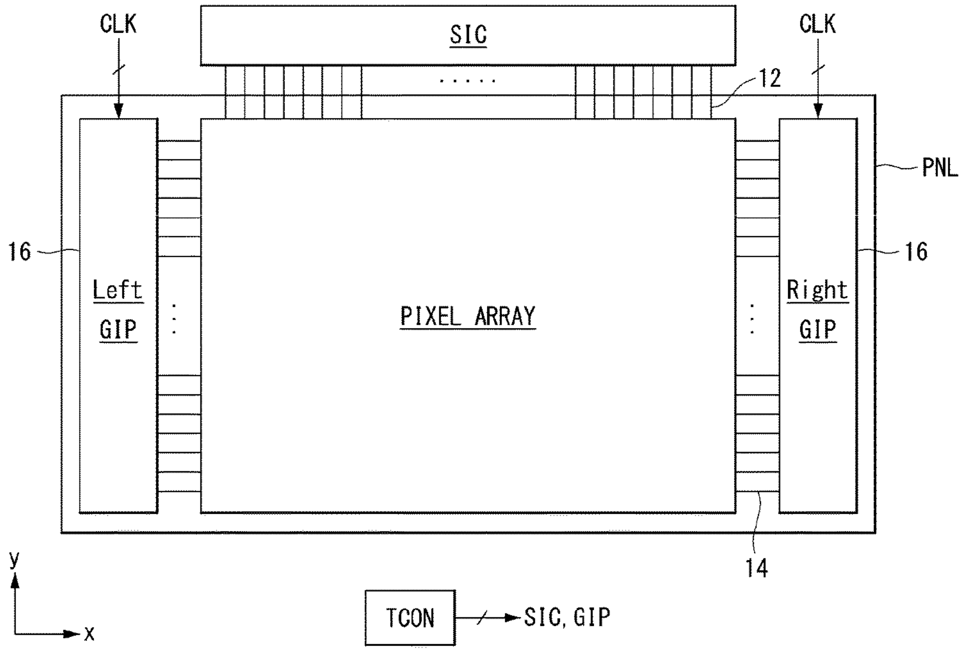
FIG. 1 is a block diagram showing a driving circuit of a display device according to an exemplary embodiment of the invention.

Referring to FIG. 1, a display device according to an exemplary embodiment of the invention includes a display panel PNL and a display panel driving circuit for writing data of an input image on a pixel array of the display panel PNL.

The display panel PNL includes data lines 12, gate lines 14 crossing the data lines 12, and a pixel array including pixels arranged in a matrix form defined by the data lines 12 and the gate lines 14. The input image is reproduced on the pixel array. A touch screen may be implemented on the display panel PNL.

The display panel driving circuit includes a data driving circuit SIC supplying a data signal to the data lines 12, a gate driving circuit sequentially supplying a gate pulse synchronized with the data signal to the gate lines 14, and a timing controller TCON.

The timing controller TCON transmits digital video data of the input image to the data driving circuit SIC and controls operation timings of the data driving circuit SIC and the gate driving circuit.

The data driving circuit SIC converts the digital video data received from the timing controller TCON into an analog gamma compensation voltage and generates a data voltage. The data driving circuit SIC then supplies the data voltage to the data lines 12.

The gate driving circuit according to the embodiment of the invention includes a left GIP (Gate-In Panel) circuit 16 and a right GIP circuit 16 asymmetrically connected to the gate lines 14. The left GIP circuit 16 is disposed in a left bezel of the display panel PNL outside the pixel array, and the right GIP circuit 16 is disposed in a right bezel of the display panel PNL outside the pixel array.

The left GIP circuit 16 sequentially generates first and second outputs, each of which has a different rising time and a different falling time, using a shift register. The right GIP circuit 16 sequentially generates first and second outputs, each of which has a different rising time and a different falling time, using a shift register. The first output from the left GIP circuit 16 is an nth gate pulse and is supplied to an nth gate line, where n is a positive integer. The second output from the right GIP circuit 16 is the nth gate pulse and is supplied to an (n+1)th gate line.

The shift register of each of the GIP circuits 16 includes stages. The stages start to output the gate pulse in response to a start pulse and shift the output in accordance with timing of a gate shift clock CLK. Output signals sequentially output from the stages are the gate pulses and are supplied to the gate lines 14. Each stage controls two or more pull-up transistors using one Q node voltage, sequentially outputs two or more gate pulses (or scan pulses), and supplies the two or more gate pulses to the gate lines 14. In the following description, the embodiments of the invention describe that one stage generates two outputs, as an example, but are not limited thereto.

Figure 2:
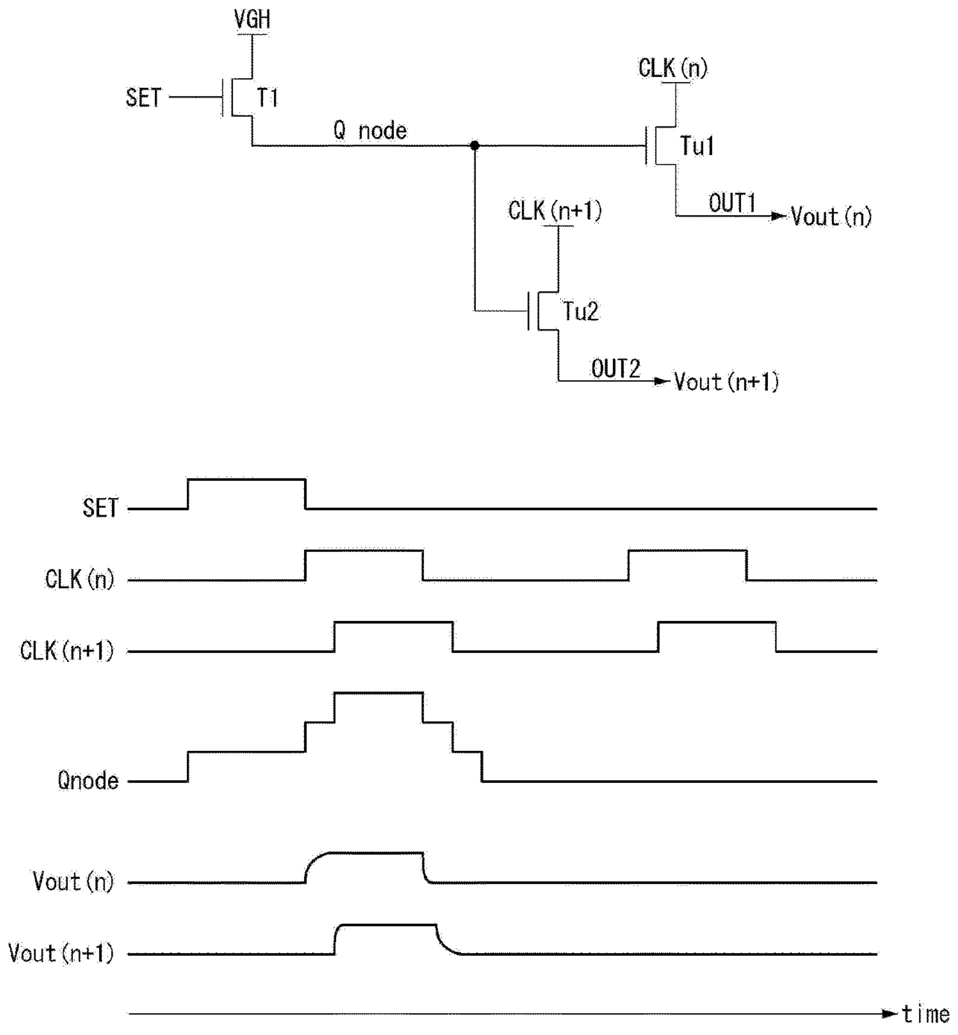
FIGS. 2 to 4 illustrate two pull-up transistors connected to one Q node and an operation thereof.
Figure 3:
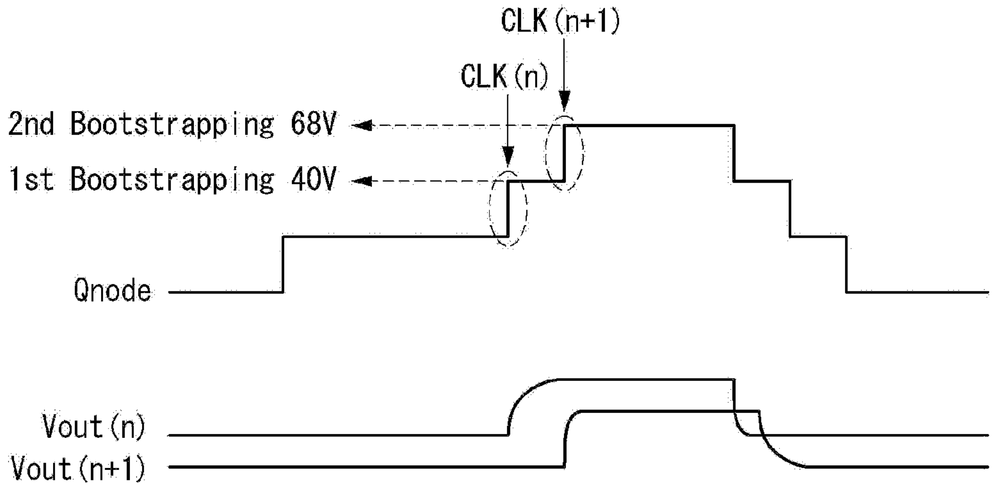
Figure 4:
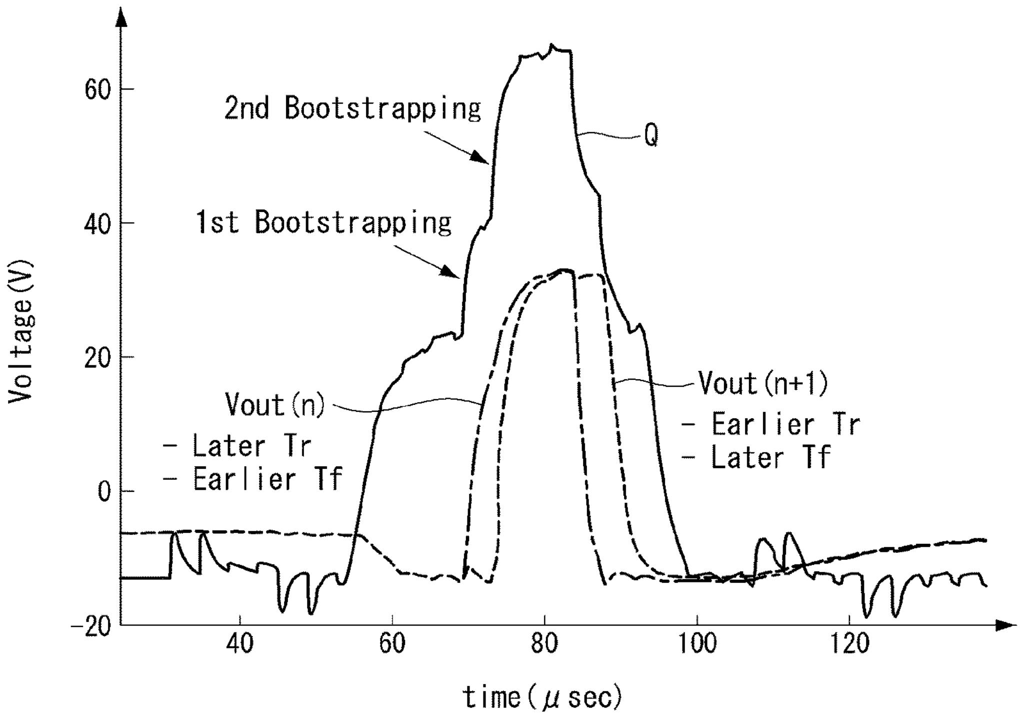

FIGS. 2 to 4 illustrate two pull-up transistors connected to one Q node and an operation thereof. In FIG. 2, a QB node and a pull-down transistor are omitted.

Referring to FIGS. 2 to 4, each stage of the shift register includes one Q node and first and second pull-up transistors Tu1 and Tu2 connected to the Q node.

The Q node is pre-charged with a gate high voltage VGH supplied through a Q charge transistor T1. The Q charge transistor T1 supplies the gate high voltage VGH to the Q node in response to a SET signal. A high potential voltage different from the gate high voltage VGH may be supplied to the Q node through the Q charge transistor T1.

When an nth clock CLK(n) (where n is a positive integer) is supplied to a drain of the first pull-up transistor Tu1 in a state where the Q node has been pre-charged, a voltage of the Q node increases due to a first bootstrapping. In this instance, the first pull-up transistor Tu1 charges a first output node OUT1 with a voltage of the nth clock CLK(n) and rises an nth output voltage Vout(n). Subsequently, when an (n+1)th clock CLK(n+1) is supplied to a drain of the second pull-up transistor Tu2, the voltage of the Q node further increases due to a second bootstrapping. As a result, the second pull-up transistor Tu2 charges a second output node OUT2 with a voltage of the (n+1)th clock CLK(n+1) and rises an (n+1)th output voltage Vout(n+1). Because the nth clock CLK(n) is earlier than the (n+1)th clock CLK(n+1), the (n+1)th output voltage Vout(n+1) is outputted subsequent to the nth output voltage Vout(n).

A gate of the first pull-up transistor Tu1 is connected to the Q node. The nth clock CLK(n) is supplied to the drain of the first pull-up transistor Tu1. A source of the first pull-up transistor Tu1 is connected to the first output node OUT1. A gate of the second pull-up transistor Tu2 is connected to the Q node. The (n+1)th clock CLK(n+1) is supplied to the drain of the second pull-up transistor Tu2. A source of the second pull-up transistor Tu2 is connected to the second output node OUT2.

An output waveform may vary depending on the voltage of the Q node. As shown in FIGS. 3 and 4, the voltage of the Q node firstly bootstrapped by the nth clock CLK(n) is about 40V, and the voltage of the Q node secondly bootstrapped by the (n+1)th clock CLK(n+1) further increases to about 68V by a pre-charge effect. Hence, a gate voltage of the second pull-up transistor Tu2 is greater than a gate voltage of the first pull-up transistor Tu1. As a result, a rising time Tr of the (n+1)th output voltage Vout(n+1) is earlier than a rising time Tr of the nth output voltage Vout(n). The rising time Tr is time required to charge an output node OUT from a gate low voltage VGL at a rising edge of the output waveform to a predetermined target voltage. Further, a falling time Tf of the (n+1)th output voltage Vout(n+1) is later than a falling time Tf of the nth output voltage Vout(n). The falling time Tf is time required to discharge the output node OUT from a predetermined target voltage at a falling edge of the output waveform to the gate low voltage VGL. The nth output voltage Vout(n) is an nth gate pulse turning on thin film transistors (TFTs) connected to an Nth gate line, where N is a positive integer. The (n+1)th output voltage Vout(n+1) is an (n+1)th gate pulse turning on TFTs connected to an (N+1)th gate line. Thus, when a waveform of the nth output voltage Vout(n) is different from a waveform of the (n+1)th output voltage Vout(n+1), a voltage charge amount of the pixel varies. Hence, a luminance difference between adjacent lines of the pixel array may be generated.

Figure 5:
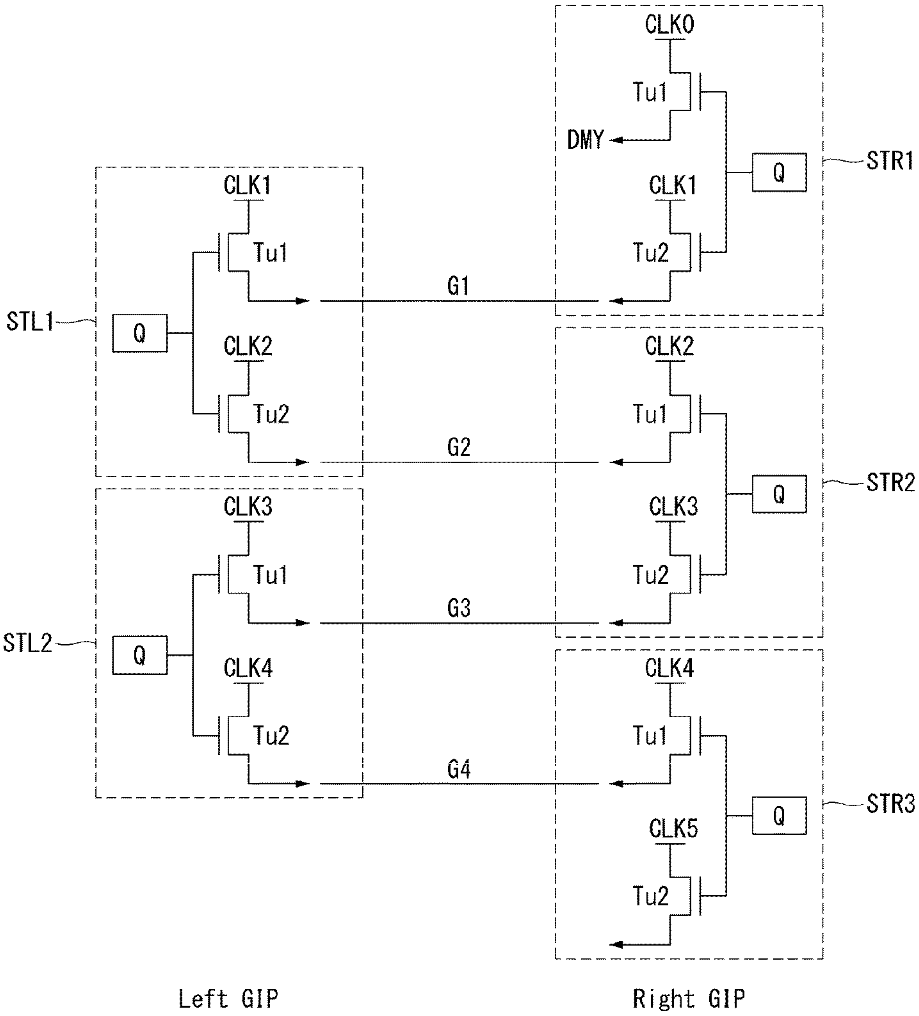
FIG. 5 is a circuit diagram showing an asymmetric connection of a left GIP (Gate-In Panel) circuit and a right GIP circuit according to an exemplary embodiment of the invention.
Figure 7:
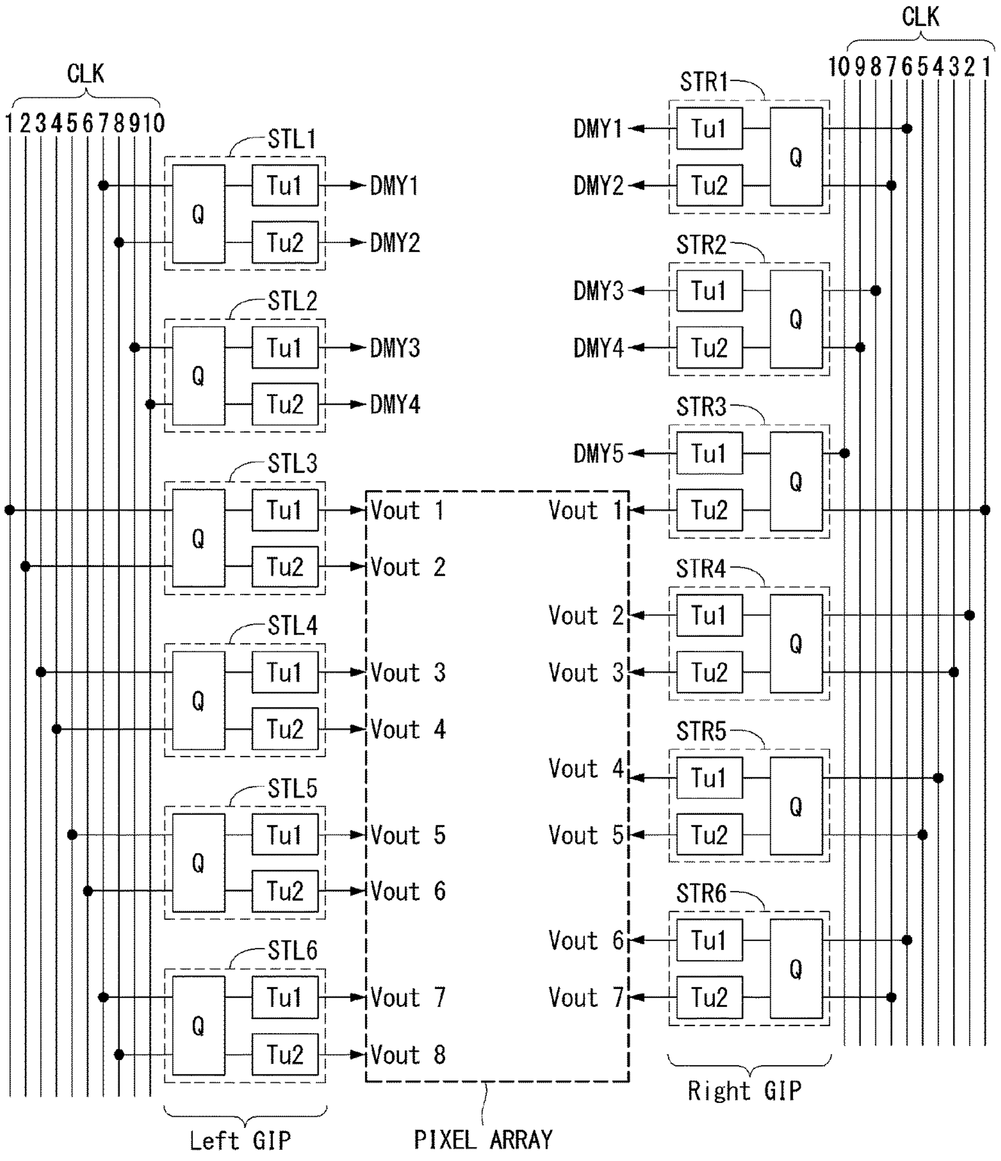
FIG. 7 illustrates an arrangement of dummy stages in an asymmetric connection of a left GIP circuit and a right GIP circuit.

The embodiment of the invention, as shown in FIGS. 5 and 7, asymmetrically connects a left GIP circuit (or the first GIP circuit) and a right second GIP circuit (or the second GIP circuit) to gate lines, so as to accord a waveform of an output voltage generated through the first bootstrapping of the Q node with a waveform of an output voltage generated through the second bootstrapping of the Q node.

Figure 6:
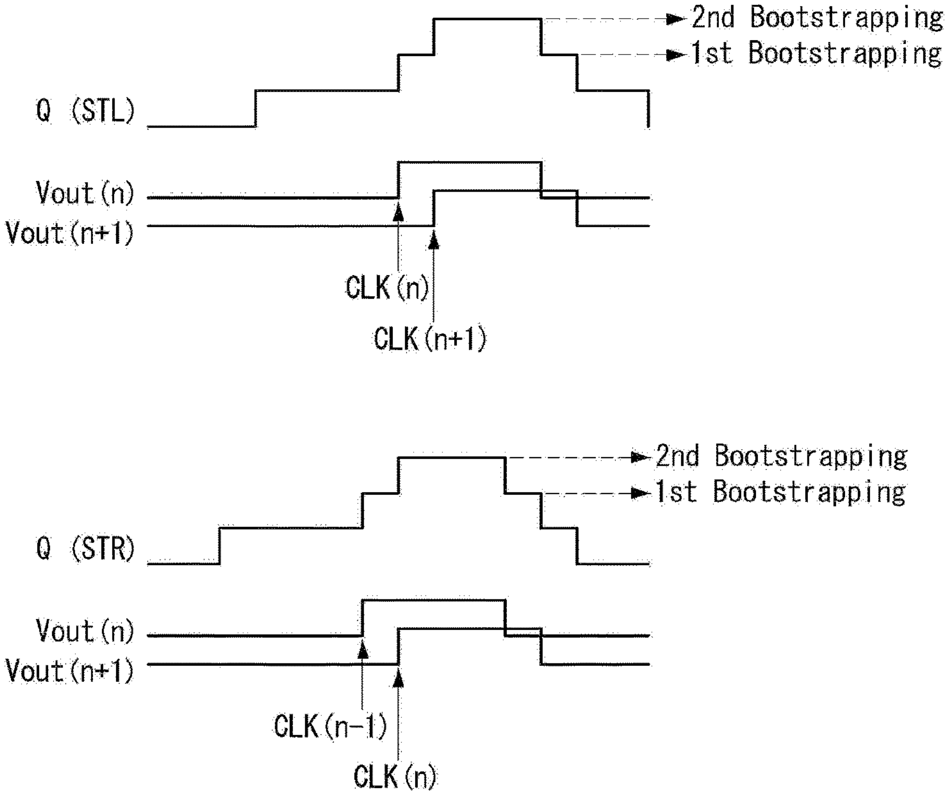
FIG. 6 is a waveform diagram showing a Q node voltage and an output voltage in a left GIP circuit and a right GIP circuit.

FIG. 5 is a circuit diagram showing a connection relationship of a left GIP circuit and a right GIP circuit according to an exemplary embodiment of the invention. FIG. 6 is a waveform diagram showing a Q node voltage and an output voltage in a left GIP circuit and a right GIP circuit.

Referring to FIGS. 5 and 6, the left GIP circuit includes a plurality of L-stages STL1 and STL2. Each of the L-stages STL1 and STL2 includes first and second pull-up transistors Tu1 and Tu2 and one Q node controlling the first and second pull-up transistors Tu1 and Tu2.

In the first L-stage STL1, the first pull-up transistor Tu1 is connected to a first gate line G1 through a first output node OUT1, and the second pull-up transistor Tu2 is connected to a second gate line G2 through a second output node OUT2.

In the second L-stage STL2, the first pull-up transistor Tu1 is connected to a third gate line G3 through a first output node OUT1, and the second pull-up transistor Tu2 is connected to a fourth gate line G4 through a second output node OUT2.

The right GIP circuit includes a plurality of R-stages STR1, STR2, and STR3. Each of the R-stages STR1, STR2, and STR3 includes first and second pull-up transistors Tu1 and Tu2 and one Q node controlling the first and second pull-up transistors Tu1 and Tu2.

The first pull-up transistor Tu1 of the first R-stage STR1 is connected to a first output node OUT1. The first output node OUT1 is a dummy node DMY, which is not connected to the gate lines of the pixel array. The second pull-up transistor Tu2 of the first R-stage STR1 is connected to the first gate line G1 through a second output node OUT2.

The first pull-up transistor Tu1 of the second R-stage STR2 is connected to the second gate line G2 through a first output node OUT1. The second pull-up transistor Tu2 of the second R-stage STR2 is connected to the third gate line G3 through a second output node OUT2.

The first pull-up transistor Tu1 of the third R-stage STR3 is connected to the fourth gate line G4 through a first output node OUT1. The second pull-up transistor Tu2 of the third R-stage STR3 is connected to a fifth gate line G5 through a second output node OUT2 as shown in FIG. 7.

The first pull-up transistor Tu1, that generates an output when the Q node is firstly bootstrapped, is connected to one end of each of the first to fourth gate lines G1 to G4. The second pull-up transistor Tu2, that generates an output when the Q node is secondly bootstrapped, is connected to the other end of each of the first to fourth gate lines G1 to G4.

A waveform of an output voltage generated when the Q node is firstly bootstrapped is different from a waveform of an output voltage generated when the Q node is secondly bootstrapped. The embodiment of the invention connects the first pull-up transistor to one end of the gate line and connects the second pull-up transistor to the other end of the gate line, thereby making a rising time and a falling time of the gate pulse applied to each of the first to fourth gate lines G1 to G4 have the same duration.

A first clock CLK1 is supplied to the first pull-up transistor Tu1 of the first L-stage STL1, and at the same time is supplied to the second pull-up transistor Tu2 of the first R-stage STR1. When a voltage of the first clock CLK1 is supplied to a drain of the first pull-up transistor Tu1 of the first L-stage STL1, charges are supplied to the Q node of the first L-stage STL1 through a parasitic capacitance between a gate and the drain of the first pull-up transistor Tu1, and thus the Q node is firstly bootstrapped. At the same time, when the voltage of the first clock CLK1 is supplied to a drain of the second pull-up transistor Tu2 of the first R-stage STR1, charges are supplied to the Q node of the first R-stage STR1 through a parasitic capacitance between a gate and the drain of the second pull-up transistor Tu2, and thus the Q node is secondly bootstrapped. As a result, a first gate pulse is supplied to one end of the first gate line G1 through the first pull-up transistor Tu1 of the first L-stage STL1, and at the same time is supplied to the other end of the first gate line G1 through the second pull-up transistor Tu2 of the first R-stage STR1 in accordance with the timing of the first clock CLK1.

A second clock CLK2 is supplied to the second pull-up transistor Tu2 of the first L-stage STL1, and at the same time is supplied to the first pull-up transistor Tu1 of the second R-stage STR2. When a voltage of the second clock CLK2 is supplied to a drain of the second pull-up transistor Tu2 of the first L-stage STL1, charges are supplied to the Q node of the first L-stage STL1 through a parasitic capacitance between a gate and the drain of the second pull-up transistor Tu2, and thus the Q node is secondly bootstrapped. At the same time, when the voltage of the second clock CLK2 is supplied to a drain of the first pull-up transistor Tu1 of the second R-stage STR2, charges are supplied to the Q node of the second R-stage STR2 through a parasitic capacitance between a gate and the drain of the first pull-up transistor Tu1, and thus the Q node is firstly bootstrapped. As a result, a second gate pulse is supplied to one end of the second gate line G2 through the second pull-up transistor Tu2 of the first L-stage STL1, and at the same time is supplied to the other end of the second gate line G2 through the first pull-up transistor Tu1 of the second R-stage STR2 in accordance with the timing of the second clock CLK2.

A third clock CLK3 is supplied to the first pull-up transistor Tu1 of the second L-stage STL2, and at the same time is supplied to the second pull-up transistor Tu2 of the second R-stage STR2. When a voltage of the third clock CLK3 is supplied to a drain of the first pull-up transistor Tu1 of the second L-stage STL2, charges are supplied to the Q node of the second L-stage STL2 through a parasitic capacitance between a gate and the drain of the first pull-up transistor Tu1, and thus the Q node is firstly bootstrapped. At the same time, when the voltage of the third clock CLK3 is supplied to a drain of the second pull-up transistor Tu2 of the second R-stage STR2, charges are supplied to the Q node of the second R-stage STR2 through a parasitic capacitance between a gate and the drain of the second pull-up transistor Tu2, and thus the Q node is secondly bootstrapped. As a result, a third gate pulse is supplied to one end of the third gate line G3 through the first pull-up transistor Tu1 of the second L-stage STL2, and at the same time is supplied to the other end of the third gate line G3 through the second pull-up transistor Tu2 of the second R-stage STR2 in accordance with the timing of the third clock CLK3.

A fourth clock CLK4 is supplied to the second pull-up transistor Tu2 of the second L-stage STL2, and at the same time is supplied to the first pull-up transistor Tu1 of the third R-stage STR3. When a voltage of the fourth clock CLK4 is supplied to a drain of the second pull-up transistor Tu2 of the second L-stage STL2, charges are supplied to the Q node of the second L-stage STL2 through a parasitic capacitance between a gate and the drain of the second pull-up transistor Tu2, and thus the Q node is secondly bootstrapped. At the same time, when the voltage of the fourth clock CLK4 is supplied to a drain of the first pull-up transistor Tu1 of the third R-stage STR3, charges are supplied to the Q node of the third R-stage STR3 through a parasitic capacitance between a gate and the drain of the first pull-up transistor Tu1, and thus the Q node is firstly bootstrapped. As a result, a fourth gate pulse is supplied to one end of the fourth gate line G4 through the second pull-up transistor Tu2 of the second L-stage STL2, and at the same time is supplied to the other end of the fourth gate line G4 through the first pull-up transistor Tu1 of the third R-stage STR3 in accordance with the timing of the fourth clock CLK4.

Figure 8:
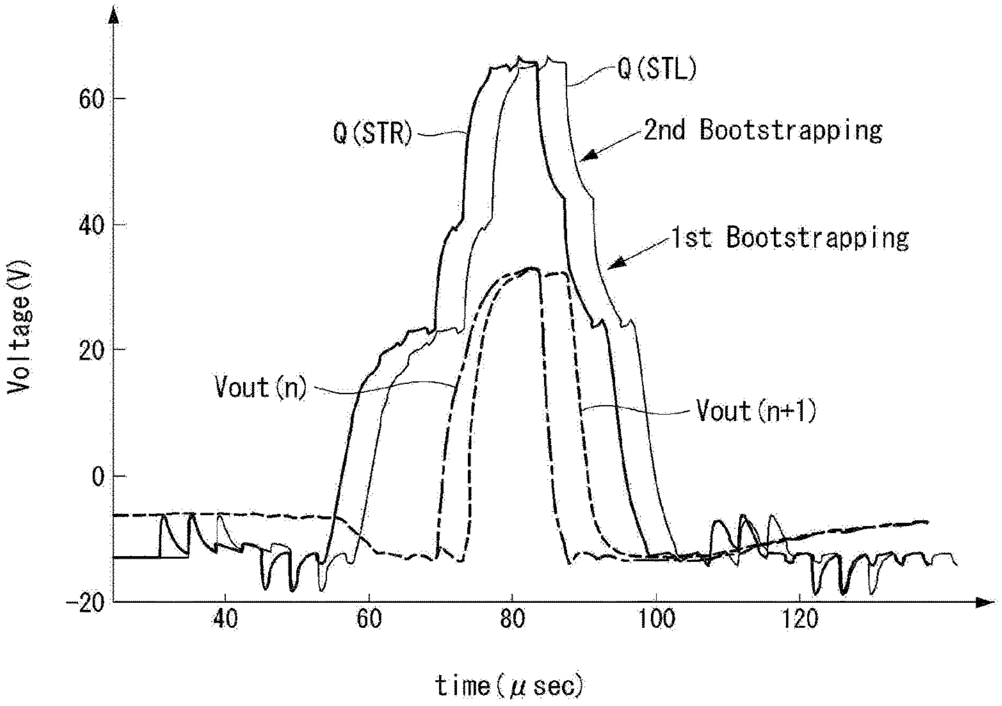
FIG. 8 is a waveform diagram showing an output of a gate driving circuit according to an exemplary embodiment of the invention measured through an experiment.

In FIG. 8, "Q(STL)" is the Q node of the L-stage included in the left GIP circuit, and "Q(STR)" is the Q node of the R-stage included in the right GIP circuit. "Vout(n)" is the nth output voltage output through the first pull-up transistor Tu1 when the Q node is firstly bootstrapped. "Vout(n+1)" is the (n+1)th output voltage output through the second pull-up transistor Tu2 when the Q node is secondly bootstrapped.

FIG. 7 illustrates an arrangement of dummy stages in an asymmetric connection of a left GIP circuit and a right GIP circuit.

Referring to FIG. 7, the embodiment of the invention shifts one of the GIP circuits connected to both ends of each gate line by one output channel and asymmetrically connects the left GIP circuit and the right GIP circuit to the gate lines. Thus, the number of dummy outputs output from the left GIP circuit is different from the number of dummy outputs output from the right GIP circuit.

Each GIP circuit may include dummy stages disconnected from the gate lines. The dummy stages generate dummy outputs DMY1 to DMY5. Because output nodes of the dummy stages are not connected to the gate lines, the dummy outputs DMY1 to DMY5 are not supplied to the gate lines and are input to a start pulse terminal or a SET signal terminal of a next stage. In an example illustrated in FIG. 7, a third L-stage STL3 may charge its Q node in response to the dummy outputs DMY3 and DMY4 output from a second L-stage STL2. A third R-stage STR3 may charge its Q node in response to the dummy outputs DMY3 and DMY4 output from a second R-stage STR2.

In the example illustrated in FIG. 7, the first and second L-stages STL1 and STL2 are dummy stages sequentially outputting the first to fourth dummy outputs DMY1 to DMY4. The first and second R-stages STR1 and STR2 are dummy stages sequentially outputting the first to fourth dummy outputs DMY1 to DMY4. The third R-stage STR3 generates a fifth dummy output DMY5 through a first pull-up transistor Tu1 and a first output node and outputs a first gate pulse through a second pull-up transistor Tu2 and a second output node.

The embodiment of the invention connects the first pull-up transistor to one end of the gate line and connects the second pull-up transistor to the other end of the gate line. As a result, the embodiment of the invention, as shown in FIG. 8, can make a rising time and a falling time of the gate pulse applied to each of the gate lines G1 to G4 have the same duration.

In addition to the above-described configurations of the GIP circuit according to the embodiments of the invention, other configurations may be used. For example, if connection configurations of the left GIP circuit and the right GIP circuit with respect to the gate lines shown in FIGS. 5 and 7 are reversed, the same effect can be obtained.

As described above, the gate driving circuit according to the embodiment of the invention generates the plurality of output voltages (or gate pulses) through the plurality of pull-up transistors controlled by one Q node. The embodiment of the invention asymmetrically connects a first gate driving circuit and a second gate driving circuit to both ends of the gate lines. As a result, the embodiment of the invention can reduce the size of the gate driving circuit and can implement the uniform image quality of the entire screen of the display device by making the gate pulses supplied to the gate lines have the same waveform.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

What is claimed is:

1. A gate driving circuit, comprising:
- a first gate driving circuit configured to sequentially generate first and second output voltages; and
- a second gate driving circuit configured to sequentially generate first and second output voltages,
- wherein the first gate driving circuit and the second gate driving circuit are asymmetrically connected to gate lines,
- wherein the first output voltage of the first gate driving circuit is supplied to an nth gate line, where n is a positive integer, and the second output voltage of the second gate driving circuit is supplied to the nth gate line,
- wherein the first gate driving circuit includes first and second pull-up transistors that are connected to one end of the nth gate line and one end of an (n+1)th gate line and successively charge the nth gate line and the (n+1)th gate line under the control of a first Q node, and
- wherein the second gate driving circuit includes third and fourth pull-up transistors that are connected to the other end of an (n−1)th gate line and the other end of the nth gate line and successively charge the (n−1)th gate line and the nth gate line under the control of a second Q node.

2. The gate driving circuit of claim 1, wherein the first output voltage of the first gate driving circuit is supplied to the nth gate line through the first pull-up transistor when the first Q node is firstly bootstrapped in response to an nth clock,
- wherein the second output voltage of the first gate driving circuit is supplied to the (n+1)th gate line through the second pull-up transistor when the first Q node is secondly bootstrapped in response to an (n+1)th clock,
- wherein the first output voltage of the second gate driving circuit is supplied to the (n−1)th gate line through the third pull-up transistor when the second Q node is firstly bootstrapped in response to an (n−1)th clock, and
- wherein the second output voltage of the second gate driving circuit is supplied to the nth gate line through the fourth pull-up transistor when the second Q node is secondly bootstrapped in response to the nth clock.

3. The gate driving circuit of claim 2, wherein each of the first and second gate driving circuits generates dummy outputs through a dummy stage disconnected from the gate lines, and
- wherein a number of dummy outputs of the first gate driving circuit is different from a number of dummy outputs of the second gate driving circuit.

4. The gate driving circuit of claim 1, wherein a rising time and a falling time of the first output voltage of the first gate driving circuit are different from a rising time and a falling time of the second output voltage of the first gate driving circuit, and wherein a rising time and a falling time of the first output voltage of the second gate driving circuit are different from a rising time and a falling time of the second output voltage of the second gate driving circuit.

5. A display device, comprising:

a display panel including data lines and gate lines;

a data driving circuit configured to supply a data signal to the data lines;

a first gate driving circuit connected to one end of the respective gate lines and configured to sequentially supply first and second output voltages to the gate lines; and a second gate driving circuit connected to the other end of the respective gate lines and configured to sequentially supply first and second output voltages to the gate lines, wherein the first gate driving circuit and the second gate driving circuit are asymmetrically connected to the gate lines, wherein the first output voltage of the first gate driving circuit is supplied to an nth gate line, where n is a positive integer, and the second output voltage of the second gate driving circuit is supplied to the nth gate line, wherein the first gate driving circuit includes first and second pull-up transistors that are connected to one end of the nth gate line and one end of an (n+1)th gate line and successively charge the nth gate line and the (n+1)th gate line under the control of a first Q node, and wherein the second gate driving circuit includes third and fourth pull-up transistors that are connected to the other end of an (n−1)th gate line and the other end of the nth gate line and successively charge the (n−1)th gate line and the nth gate line under the control of a second Q node.

6. The display device of claim 5, wherein the first output voltage of the first gate driving circuit is supplied to the nth gate line through the first pull-up transistor when the first Q node is firstly bootstrapped in response to an nth clock, wherein the second output voltage of the first gate driving circuit is supplied to the (n+1)th gate line through the second pull-up transistor when the first Q node is secondly bootstrapped in response to an (n+1)th clock, wherein the first output voltage of the second gate driving circuit is supplied to the (n−1)th gate line through the third pull-up transistor when the second Q node is firstly bootstrapped in response to an (n−1)th clock, and wherein the second output voltage of the second gate driving circuit is supplied to the nth gate line through the fourth pull-up transistor when the second Q node is secondly bootstrapped in response to the nth clock.

7. A gate driving circuit, comprising:

a first pull-up transistor configured to drive a first gate line in response to a first Q node voltage;

a second pull-up transistor configured to drive a second gate line in response to the first Q node voltage;

a third pull-up transistor configured to drive the second gate line in response to a second Q node voltage;

a fourth pull-up transistor configured to drive a third gate line in response to the second Q node voltage;

wherein the first Q node voltage is firstly bootstrapped when a first clock is applied to the first pull-up transistor and then is secondly bootstrapped when a second clock is applied to the second pull-up transistor, and wherein the second Q node voltage is firstly bootstrapped when the second clock is applied to the third pull-up transistor and then is secondly bootstrapped when a third clock is applied to the fourth pull-up transistor.

* * * * *